US008935405B2

(12) United States Patent
Stirbu et al.

(10) Patent No.: US 8,935,405 B2
(45) Date of Patent: Jan. 13, 2015

(54) EXPANDING UNIVERSAL PLUG AND PLAY CAPABILITIES IN POWER CONSTRAINED ENVIRONMENT

(75) Inventors: Vlad Stirbu, Tampere (FI); Mika Saaranen, Pirkkala (FI)

(73) Assignee: Nokia Corporation, Espoo (FI)

( * ) Notice: Subject to any disclaimer, the term of this patent is extended or adjusted under 35 U.S.C. 154(b) by 2066 days.

(21) Appl. No.: 11/082,633

(22) Filed: Mar. 7, 2005

(65) Prior Publication Data

US 2006/0199621 A1    Sep. 7, 2006

(51) Int. Cl.
| G06F 15/16 | (2006.01) |
| H04W 52/02 | (2009.01) |
| H04L 1/18 | (2006.01) |
| H04W 28/04 | (2009.01) |
| H04W 28/18 | (2009.01) |
| H04W 80/00 | (2009.01) |

(52) U.S. Cl.
CPC .......... H04W 52/0225 (2013.01); *H04L 1/188* (2013.01); *H04W 28/04* (2013.01); *H04W 28/18* (2013.01); *H04W 80/00* (2013.01); *Y02B 60/50* (2013.01)
USPC ........... 709/227; 709/228; 709/229; 370/338; 370/350; 370/395.32; 455/574

(58) Field of Classification Search
USPC ............ 709/227–229; 370/338, 350, 395.32; 455/574
See application file for complete search history.

(56) References Cited

U.S. PATENT DOCUMENTS

| 6,212,175 B1* | 4/2001 | Harsch ......................... 370/338 |
| 6,215,782 B1* | 4/2001 | Buskens et al. ............... 370/350 |
| 7,006,852 B2* | 2/2006 | Morioka et al. .............. 455/574 |
| 7,248,589 B2* | 7/2007 | Banerjee et al. ......... 370/395.32 |

FOREIGN PATENT DOCUMENTS

| KR | 2003-0096335 | 4/2001 |
| WO | WO 02/28032 | 4/2002 |
| WO | WO 02/087266 | 10/2002 |
| WO | WO 2005/076567 A-1 | 8/2005 |

OTHER PUBLICATIONS

"TCP Adaptive User TimeOut (Auto) Option", Internet Draft, May 19, 2004. http://mirrors.isc.org/pub/www.watersprings.org/pub/id/draft-gont-tcpm-tcp-auto-option-00.txt.*
"Extending TCP Retransmission Timeout at mobile IP Handoffs for Windows 2000: A Case Study", ConTel 2003.*

(Continued)

*Primary Examiner* — Michael C Lai
(74) *Attorney, Agent, or Firm* — Harrington & Smith (57) ABSTRACT

This invention describes a method for expanding universal plug and play capabilities in a power constrained environment thus facilitating communication between two terminals with universal plug and play (UPnP) application capabilities, wherein one of the terminals is in a sleeping mode. The present invention can be applied (but not be limited) to mobile terminals, wireless devices, portable devices, mobile communication devices, mobile phones, etc. The invention describes a mechanism in which the UPnP application dynamically instructs the TCP/IP stack to tune-up its parameters so that it can tolerate longer delays and timeouts, due to the fact that it operates in a power constrained UPnP environment.

20 Claims, 7 Drawing Sheets

(56) References Cited

OTHER PUBLICATIONS

Extending TCP Retransmission Timeout at Mobile IP Handoffs for Windows 2000: A Case Study Tzu-Chi Huang, Ce-Kuen Shieh, 7th International Conference on Telecommunications—Con TEL 2003, ISBN: 953-184-052-0, Jun. 11-13, 2003, Sagreb,Croatia.

TCP Adaptive User TimeOut (Auto) Option, F. Gont, Internet-Draft, May 19, 2004 http://mirrors.isc.org/pub/www.watersprings.org/pub/id/draft-gont-tcpm-tcp-auto-option-00.txt.

Korean Intellectual Property Office; "Non-Final Rejection"; whole document; Oct. 22, 2009; English translation included.

F. Gont; "TCP Adaptive User TimeOut (Auto) Option, draft-gont-tcpm-tcp-auto-option-OO.txt"; IETF Standard-Working-Draft, Internet Engineering Task Force; May 19, 2004; whole document; IETF.

\* cited by examiner

EXPANDING UNIVERSAL PLUG AND PLAY CAPABILITIES IN POWER CONSTRAINED ENVIRONMENT

FIELD OF THE INVENTION

This invention generally relates to communication systems and more specifically to expanding universal plug and play capabilities in power constrained environment

BACKGROUND ART

Universal plug and play (UPnP™) technology defines an architecture for pervasive peer-to-peer network connectivity of intelligent appliances, wireless devices, and PCs. It is designed to bring easy-to-use, flexible, standards-based connectivity to, e.g., ad-hoc or unmanaged networks whether in the home, in a small business, public spaces, or attached to the Internet. The UPnP technology provides a distributed, open networking architecture that leverages TCP/IP and the Web technologies to enable seamless proximity networking in addition to control and data transfer among networked devices.

The UPnP Device Architecture (UDA) is designed to support zero-configuration, "invisible" networking, and automatic discovery for a breadth of device categories from a wide range of vendors. This means a device can dynamically join a network, obtain an IP address, convey its capabilities, and learn about the presence and capabilities of other devices.

A Berkeley socket application programming interface (API) comprises a library for developing applications written in C programming language that access a computer network. Berkeley sockets, also known as the BSD (Berkeley software distribution) socket API originated with the 4.2BSD system as an API. The BSD socket API forms the de facto standard abstraction for network sockets. Most other programming languages use a similar interface as the C API.

Existing standards (e.g., UPnP protocols) in the Digital Home are not friendly towards constrained devices that have a limited battery lifetime and also limited bearer bandwidth (e.g. BLUETOOTH). The UPnP protocols do not have power saving requirements during design time which prevents mobile constrained devices to use power saving techniques in order to extend a battery lifetime. The UPnP protocols allow a device to be active/present in the network, in which case the device needs to have the communication subsystem up (i.e., powered) all the time, or otherwise to be disconnected from the network. Obviously this limited behavior is not enough for constrained devices that want to preserve power by intelligently adapting the power states of communication subsystems.

Terminals can be connected to the network using a wired or a wireless (including, e.g., BLUETOOTH) technology. Some of the terminals are always connected to a power source (e.g., desktop computers, TV sets, personal video recorders, etc.), some are battery powered (e.g., mobile phones, personal digital assistants, etc.), and some can have both characteristics (e.g., laptop computers). In order to increase the lifetime of a battery for portable electronic devices (battery operated), a quite common approach is to put the communication subsystem in a low power mode state, e.g., a power saving mode for a WLAN (wireless local area network) or a sniff and hold mode for a BLUETOOTH. While the communication subsystem (e.g., a terminal) is in a power saving mode, the ability to transmit and receive messages over the network to/from that subsystem through the network is dramatically reduced, making the responsiveness of that subsystem very low or non-existent. To compensate this drawback, an access point of the network is usually caching the messages until the sleeping device is woken-up.

To further enhance this power saving scheme, interworking functions can be added to access points so that they can intelligently filter the communications cached in the buffer. One of the interworking functions that can be implemented in access points operating in the UPnP networks is to filter the UDP (user datagram protocol) multicast traffic for the devices that are in the power saving mode. Moreover, the interworking function detects when the TCP traffic is intended for the terminals which is, e.g., in a sleeping mode and can immediately start the wake-up procedure for the respective device. This prior art procedure is described, e.g., in Finnish patent application No. 20040179 "Optimization of Data Transfer between Networked Devices", by Vlad Stirbu and Mika Saaranen, filed on Feb. 6, 2004

Furthermore, the sleeping mode (or similarly an intermediate mode, i.e., less active than normal but more active than the sleeping mode) provides high energy saving level with assumption that the terminal (such as a mobile device) can be woken-up in a reasonable time. Even in case of a standby mode exploiting bearer level energy savings, where the link can be activated by the incoming traffic, it requires unreasonably significant time to wake up. Sleeping mode is by its definition slower (slower than, e.g., less stringent modes), i.e., it requires more time to wake up the device and therefore more TCP protocol delays and re-transmissions occur. So, because the receiving device is in the standby mode, it takes longer time for it to respond. This time may (or generally will) exceed a TCP retransmission time or even a socket time out may occur. The socket time out is a part of the socket implementation defining the time that can be used for establishing a connection before giving up this attempt. This is separate time out mechanism than defined for TCP protocol itself. This leads to a poor usage of networking resources, quite frequently causing spurious errors visible to the users. This is, naturally, leading to a degraded user experience.

DISCLOSURE OF THE INVENTION

The object of the present invention is to provide a method for expanding universal plug and play capabilities in a power constrained environment thus facilitating communication between two terminals with available universal plug and play application capabilities on the terminals, wherein one of them is in a sleeping mode.

According to a first aspect of the invention, a method for communicating of a terminal with a further terminal through a network in a power constrained environment using a communication application available in the terminal, comprises the steps of: receiving by the terminal a notification about a power saving mode of the further terminal; providing to the network by a protocol stack of the terminal a communication signal intended for the further terminal by transmitting the communication signal according to a pre-selected procedure; and receiving by the terminal, after the further terminal is woken up, an acknowledgement of receiving the communication signal by the further terminal, wherein the terminal waits for the acknowledgement at least for a time interval needed for that further terminal to wake up before terminating the communicating based on a predetermined criterion facilitated by the communication application of the terminal.

Further according to the first aspect of the invention, the power saving mode may be a sleeping mode.

Still further according to the first aspect of the invention, the communication application may be a universal plug application, the protocol stack may be a TCP/IP stack and there may be no connection established between the terminal and the further terminal before the step of receiving by the terminal the notification, and wherein before the step of the providing to the network by the terminal the communication signal, the method may comprise the steps of: creating by the universal plug and play application a new socket in the TCP/IP stack of the terminal for communicating with the further terminal; setting by the universal plug and play application a new socket option SO-CONTIMEO defining in the TCP/IP stack a time limit for establishing the connection with the further terminal; and instructing the TCP/IP stack by the universal plug and play application to establish the connection with the further terminal. Further, the communication signal may be provided to the network in response to the instructing, the communication signal may be a connection communication signal which initiates establishing of the connection, the acknowledgement may be an acknowledgement for establishing a successful connection between the terminal and the further terminal and the time interval may be defined by the time limit defined by the new socket option SO-CONTIMEO.

According further to the first aspect of the invention, the communication application may be a universal plug application, the protocol stack may be a TCP/IP stack and there may be no connection established between the terminal and the further terminal before the step of receiving by the terminal the notification, and wherein before the step of the providing to the network by the terminal the communication signal, the method may comprise the steps of: creating by the universal plug and play application a new socket in the TCP/IP stack of the terminal for communicating with the further terminal; and instructing the TCP/IP stack by the universal plug and play application to establish the connection with the further terminal. Still further, the communication signal may be a connection communication signal which initiates establishing of the connection and the acknowledgement may be an acknowledgement for establishing a successful connection between the terminal and the further terminal and wherein the step of the providing to the network by the terminal the communication signal may comprise the steps of: providing to the network by the terminal the communication signal in response to the instructing by the re-transmitting the communication signal according to the pre-selected procedure; receiving a time-out error by the universal plug and play application; further instructing the TCP/IP stack by the universal plug and play application to establish the connection with the further terminal by the re-transmitting the communication signal according to a pre-selected procedure after a predetermined time period which is at least equal to the time interval needed for that further terminal to wake up; and providing to the network by the terminal the communication signal in response to the further instructing by re-transmitting the communication signal according to the pre-selected procedure.

According still further to the first aspect of the invention, the communication application may be a universal plug application, the protocol stack may be a TCP/IP stack and there may be a connection established between the terminal and the further terminal before the step of receiving by the terminal the notification and a socket may be already created by the universal plug and play application in the TCP/IP stack of the terminal for communicating with the further terminal, and wherein before the step of the providing to the network by the terminal the communication signal, the method may comprise the steps of: setting by the universal plug and play application a socket option SO-SNDTIMEO, defining in the TCP/IP stack a time limit for sending the communication signal by the terminal, and a socket option SO-RCVTIMEO, defining in the TCP/IP stack a time limit for receiving response data from the further terminal; and instructing the TCP/IP stack by the universal plug and play application to send the communication signal to the further terminal. Further still, the communication signal may be provided to the network in response to the instructing, the communication signal may be a data communication signal containing data sent to the further terminal, the acknowledgement may be an acknowledgement of successfully receiving the data communication signal by the further terminal and the time interval may be defined by the time limit defined by the socket option SO-SNDTIMEO. Still further, the first aspect of the invention may further comprise the step of: sending a further data communication signal by the further terminal to the terminal and receiving the further data communication signal by the terminal if the time limit defined by the socket option SO-RCVTIMEO for the receiving data from the further terminal is not expired.

According further still to the first aspect of the invention, the operations performed on or by the protocol stack may be facilitated by a Berkeley software distribution (BSD) socket application programming interface (API).

According yet further still to the first aspect of the invention, the terminal or the further terminal may be a mobile terminal, a wireless device, a portable device, a mobile communication device or a mobile phone.

According to a second aspect of the invention, a computer program product comprises: a computer readable storage structure embodying computer program code thereon for execution by a computer processor with the computer program code characterized in that it includes instructions for performing the steps of the first aspect of the invention indicated as being performed by any component or a combination of components of the terminal, the further terminal or the network.

According to a third aspect of the invention, a terminal capable of communicating with a further terminal through a network in a power constrained environment, comprises: a protocol stack, responsive to a notification about a power saving mode of the further terminal, for providing to the network a communication signal intended for the further terminal by transmitting the communication signal according to a pre-selected procedure; a communication application, for providing to the protocol stack instructions according to a predetermined criterion defining a waiting period for receiving an acknowledgement of receiving the communication signal by the further terminal after the further terminal is woken up, wherein the waiting period is at least as long as a time interval needed for the further terminal to wake up.

According further to the third aspect of the invention, the power saving mode may be a sleeping mode.

Further according to the third aspect of the invention, the communication application may be a universal plug application, the protocol stack may be a TCP/IP stack and there may be no connection established between the terminal and the further terminal before receiving by the terminal the notification, and wherein before the providing to the network by the terminal the communication signal the universal plug and play application may provide: creation of a new socket in the TCP/IP stack for communicating with the further terminal; setting a new socket option SO-CONTIMEO defining in the TCP/IP stack a time limit for establishing the connection with the further terminal; and instruction to the TCP/IP stack for establishing the connection with the further terminal. Further, the communication signal may be provided to the network in response to the instructing, the communication signal may be a connection communication signal which initiates establishing of the connection, the acknowledgement may be an acknowledgement for establishing a successful connection between the terminal and the further terminal and the time interval may be defined by the time limit defined by the new socket option SO-CONTIMEO.

Still further according to the third aspect of the invention, the communication application may be a universal plug application, the protocol stack may be a TCP/IP stack and there may be no connection established between the terminal and the further terminal before the step of receiving by the terminal the notification, and wherein before the providing to the network by the terminal the communication signal the universal plug and play application may provide: creation of a new socket in the TCP/IP stack for communicating with the further terminal; and instruction to the TCP/IP stack for establishing the connection with the further terminal. Further, the communication signal may be a connection communication signal which initiates establishing of the connection and the acknowledgement may be an acknowledgement for establishing a successful connection between the terminal and the further terminal and wherein providing to the network by the terminal the communication signal may comprise: providing to the network by the terminal the communication signal in response to the instructing by the re-transmitting the communication signal according to the pre-selected procedure; receiving a time-out error by the universal plug and play application; further instructing the TCP/IP stack by the universal plug and play application to establish the connection with the further terminal by the re-transmitting the communication signal according to a pre-selected procedure after a predetermined time period which is at least equal to the time interval needed for that further terminal to wake up; and providing to the network by the terminal the communication signal in response to the further instructing by re-transmitting the communication signal according to the pre-selected procedure.

According further to the third aspect of the invention, the communication application may be a universal plug application, the protocol stack may be a TCP/IP stack and there may be a connection established between the terminal and the further terminal before receiving by the terminal the notification and a socket may be already created by the universal plug and play application in the TCP/IP stack of the terminal for communicating with the further terminal, and wherein before providing to the network by the terminal the communication signal, the universal plug and play application may provide: setting in the TCP/IP stack a socket option SO-SNDTIMEO defining a time limit for sending the communication signal by the terminal, and a socket option SO-RCVTIMEO defining a time limit for receiving data from the further terminal; and instructing the TCP/IP stack to send the pocket signal to the further terminal. Further, the communication signal may be provided to the network in response to the instruction, the communication signal may be a data communication signal containing data sent to the further terminal, the acknowledgement may be an acknowledgement of successfully receiving the data communication signal by the further terminal and the time interval may be defined by the time limit defined by the socket option SO-SNDTIMEO. Still further, the further terminal after receiving the data communication signal from the terminal may send a further data communication signal to the terminal and the further data communication signal may be received by the terminal if the time limit defined by the socket option SO-SNDTIMEO for the receiving data from the further terminal is not expired.

Further according to the third aspect of the invention, the operations performed on or by the protocol stack may be facilitated by a Berkeley software distribution (BSD) socket application programming interface (API).

According to a fourth aspect of the invention, a communication system providing communicating in a power constrained environment, comprises: a further terminal being a power saving mode, responsive to a wake up call; a terminal, responsive to a notification about a power saving mode of the further terminal, for providing by the terminal a communication signal intended for the further terminal by transmitting the communication signal according to a pre-selected procedure, for providing a predetermined criterion defining a waiting period for receiving an acknowledgement of receiving the communication signal by the further terminal after the further terminal is woken up, wherein the waiting period is at least as long as a time interval needed for that further terminal to wake up; a network, for providing the notification, for providing the wake up call for waking up the further terminal in response to the communication signal, for facilitating sending signals between the terminal and the further terminal, wherein a universal plug and play application is available in the terminal and the further terminal.

According to a fifth aspect of the invention, a method for communicating between a terminal and a further terminal through a network in a power constrained environment using a communication application available in the terminal and the further terminal, comprises the steps of: receiving by the terminal a notification about a power saving mode of the further terminal; providing to the network by a protocol stack of the terminal a communication signal intended for the further terminal by transmitting the communication signal according to a pre-selected procedure; detecting the communication signal and starting a wake-up process of the further terminal in response to the communication signal; and receiving, after the further terminal is woken up, the communication signal by the further terminal and sending an acknowledgement of receiving the communication signal to the terminal by the further terminal, wherein the terminal waits for the acknowledgement at least for a time interval needed for that further terminal to wake up before terminating the communicating based on a predetermined criterion facilitated by a communication application of the terminal.

The present invention reduces a number of spurious application errors due to a socket time out. For applications not aware of energy saving delays, this invention will help users not to see errors because of energy saving delays.

The present invention also leads to more efficient use of the sockets: there is only one socket used per session as there is no need to open a new one due to time out error.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

The present invention provides a new methodology for expanding universal plug and play capabilities in a power constrained environment thus facilitating communication between two terminals with universal plug and play (UPnP) application capabilities, wherein one of the terminals is in a sleeping mode. The present invention can be applied (but not be limited) to mobile terminals, wireless devices, portable devices, mobile communication devices, mobile phone, etc.

The present invention describes a mechanism in which the UPnP application dynamically instructs the TCP/IP stack (involving network socket implementation) to tune-up its parameters so that it can tolerate longer delays and timeouts, due to the fact that it operates in a power constrained UPnP environment.

The implementation of this invention can be related, e.g., to a number of BSD (Berkeley software distribution) socket options for setting instructions according to a predetermined criterion in the TCP/IP stack of a terminal (i.e., the originating terminal which is trying to establish a connection with a further terminal) or using said UPnP application based on the predetermined criterion as described below in detail. The UPnP application of the terminal is trying to communicate (e.g., establishing a new communication session between the terminals or transmitting data after the further terminal went to a sleeping mode during a communication session) with another UPnP application of the further terminal that is in a power saving mode (e.g., in a sleeping mode) and should accommodate the above mentioned parameters so that the further terminal is able to wake up in a time interval that is shorter than the timeout period, according to the present invention.

Figure 1:
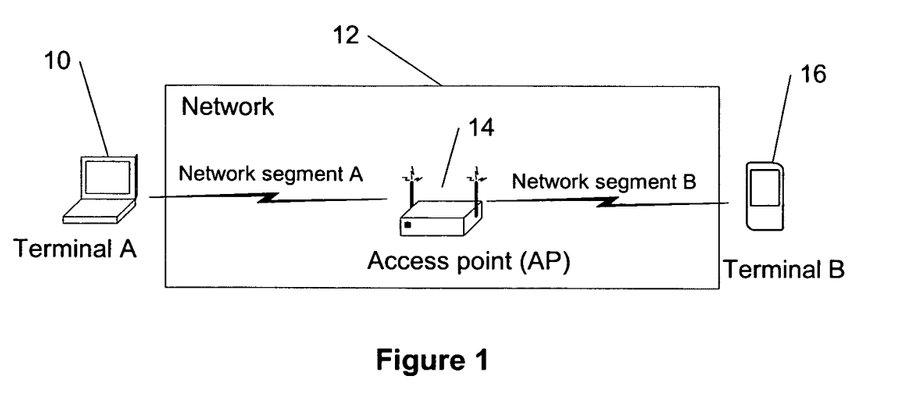
FIG. 1 is a block diagram demonstrating a communication system environment for implementing the present invention.

FIG. 1 is one example among others of a block diagram demonstrating a communication system environment for implementing the present invention. A terminal A 10 (it is also called here a terminal) and a terminal B 16 (it is also called here a further terminal) are capable of communicating through a network 12 having an access point (AP) 14 with an interworking function (or similar) deployed in the network 12 and that the traffic between the terminal A 10 and the terminal B 16 is routed via this AP 12. In this context for the examples presented below it is assumed that the terminal B 16 is the one that is able to switch to a power saving mode and that the terminal A 10 is a reference device as all socket operations will happen in this terminal A 10.

Figure 2:
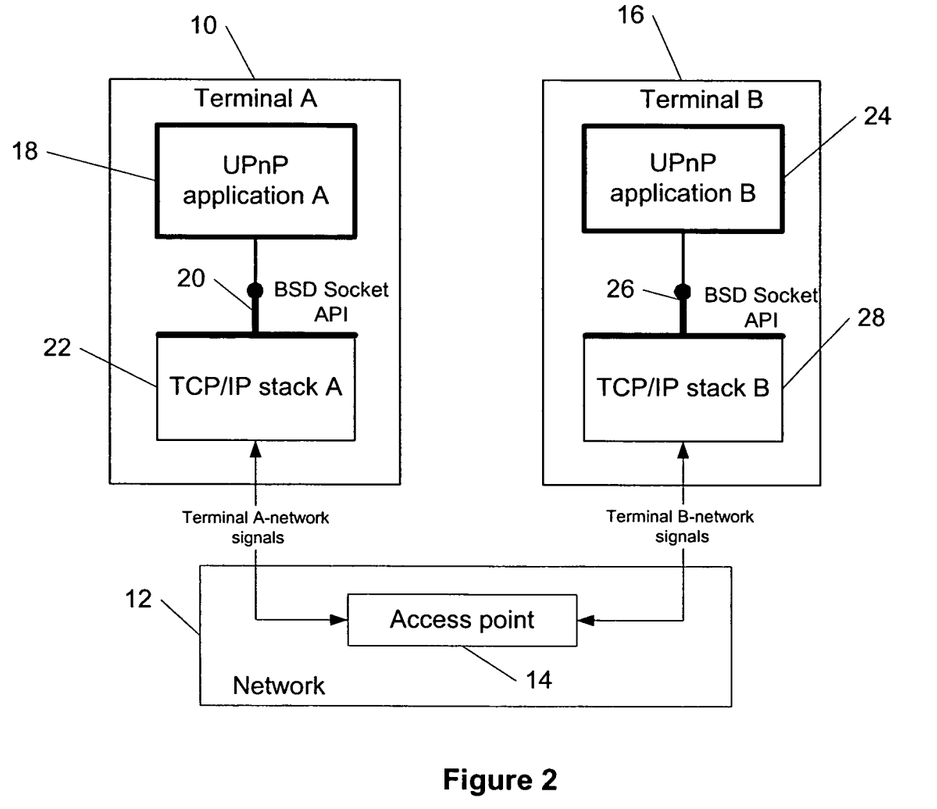
FIG. 2 is a block diagram of a communication system providing more detailed description of system components for implementing the present invention.

FIG. 2 is a further example among others of a block diagram of a communication system providing more detailed description of blocks 10 and 16 for implementing the present invention. The terminal A 10 contains a universal plug and play application A 18, which provides to a TCP/IP stack 22 instructions according to a predetermined criterion defining a waiting period for tolerating longer delays and timeouts. The TCP/IP stack 22 is responsive to a notification from the network 12) about a power saving mode of a further terminal (the terminal B 16) and provides to the network 12 a communication signal (described in more detail below) intended for said further terminal 16 by re-transmitting said communication signal according to a pre-selected procedure. A Berkeley software distribution (BSD) socket application programming interface (API) 20 facilitates operations performed on or by the TCP/IP stack 22. The terminal B 16 has similar features as the terminal A 10 with similar functions: a universal plug and play application A 24, a TCP/IP stack B 28 and a BSD Socket API 26.

Figure 3A:
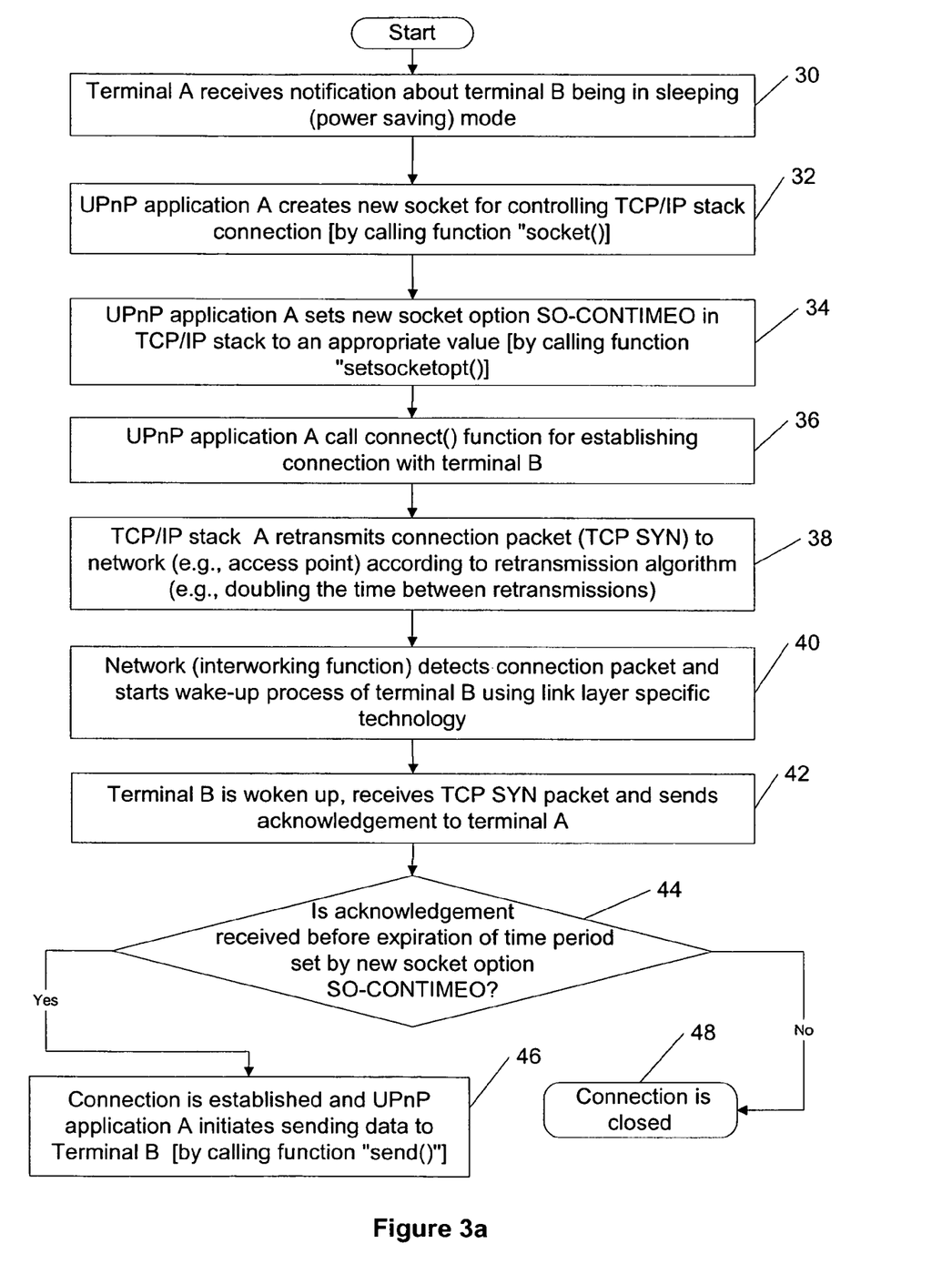
FIGS. 3a and 3b are a flow chart and a diagram, respectively, describing one embodiment wherein the prior connection is not established between a terminal and a further terminal and the further terminal is in a sleeping mode, according to the present invention.
Figure 3B:
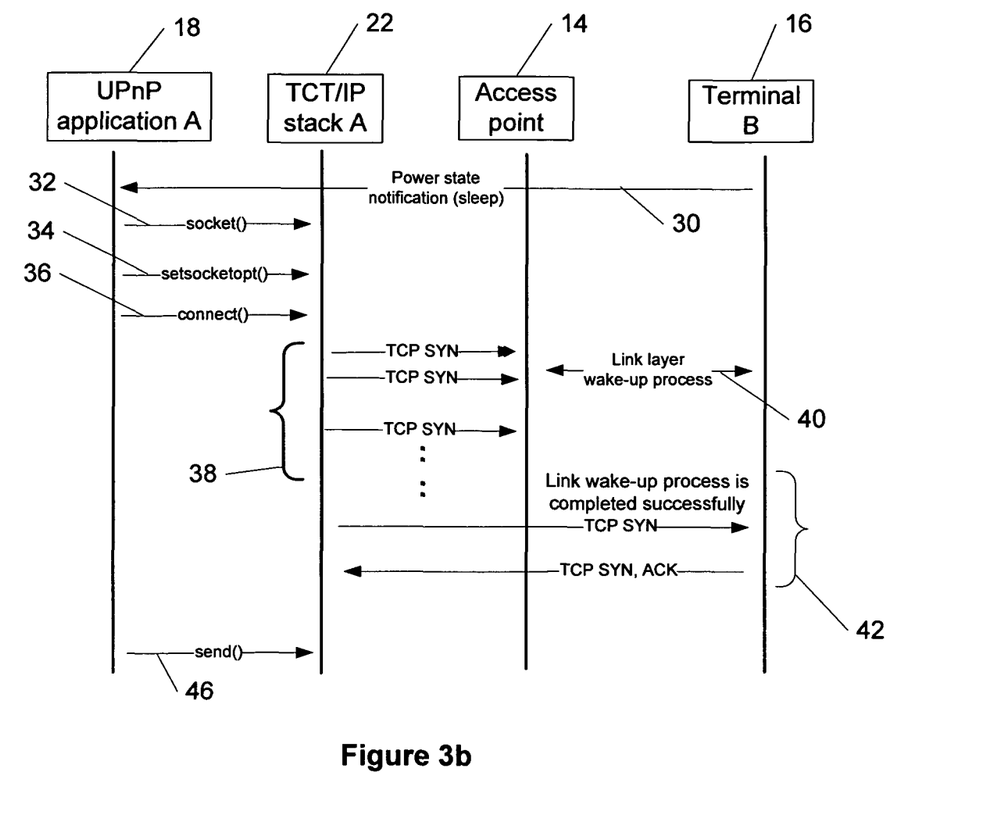

FIGS. 3a and 3b are a flow chart and a diagram, respectively, describing one embodiment among others, wherein the prior connection is not established between a terminal 10 (the terminal A) and a further terminal 16 (the terminal B) and the further terminal 16 is in a sleeping mode, according to the present invention. FIG. 3b is complimentary to FIG. 3a and presented for more detailed and in-depth understanding of the flow chart of FIG. 3a.

The flow chart of FIG. 3a represents only one possible scenario among many others. In a method according to the present invention, in a first step 30, the terminal A 10 receives a notification about the terminal B 16 being in the sleeping (power saving) mode. The information about the nature of the power saving mode of the terminal B (further terminal) 16 can be contained, e.g., as indications in the universal plug and play (UPnP) advertisement of the terminal B 16 (e.g., SSDP (simple service discovery protocol) low power specific headers) or in the device description document.

In a next step 32, the universal plug and play application 18 of the terminal 10 creates a new socket in the TCP/IP stack A 22 using, e.g., socket( ) function (as shown in FIG. 3b) for communicating with the further terminal 16. In a next step 34, the universal plug and play application 18 sets a new socket option SO-CONTIMEO using, e.g., a setsocketopt( ) function (as shown in FIG. 3b) defining in the TCP/IP stack A 22 a time limit for establishing the connection with the further terminal (terminal B) 16 (in order to prevent the function connect( ) described below to return a timeout error) according to the predetermined criterion. Typically, the SO_CONTIMEO is set to a value that is slightly bigger than the time required for the Terminal B 16 to wake-up, according to the present invention. In a next step 36, the universal plug and play application 18 instructs the TCP/IP stack A 22 to establish the connection using, e.g., a connect( ) function (as shown in FIG. 3b) with the further terminal 16.

In a next step 38, the TCP/IP stack A 22 transmits (or re-transmits) a connection communication (shown as a TCP SYN in FIG. 3b) to the network 12 (e.g., the access point 14) according to a known retransmission algorithm (e.g., by doubling the time between retransmissions). In a next step 40, the network 12 (the interworking function) detects the connection communication and starts a wake-up process of the terminal B 16 attempting to wake up the terminal B 16 using, e.g., a link layer specific technology (or, alternatively, when the terminal B16 polls incoming packets, it notices a connection establishment and moves to an active state). In a next step 42, the terminal B 16 is woken up, receives the connection communication and sends an acknowledgement (shown as the TCP SYN, ACK in FIG. 3b) to the terminal A 10.

In a next step 44, it is ascertained whether the acknowledgement is received before the expiration of the time period set by the new socket option SO-CONTIMEO. As long as that is not the case, the connection session is in the undetermined state and is closed in step 48. However, if it is ascertained that the acknowledgement is received before the expiration of the time period set by the new socket option SO-CONTIMEO, in a next step 46, the connection is established and the UPnP application A 18 initiates sending data to the terminal B 16 (e.g., by calling a send( ) function as shown in FIG. 3*b*).

Figure 4A:
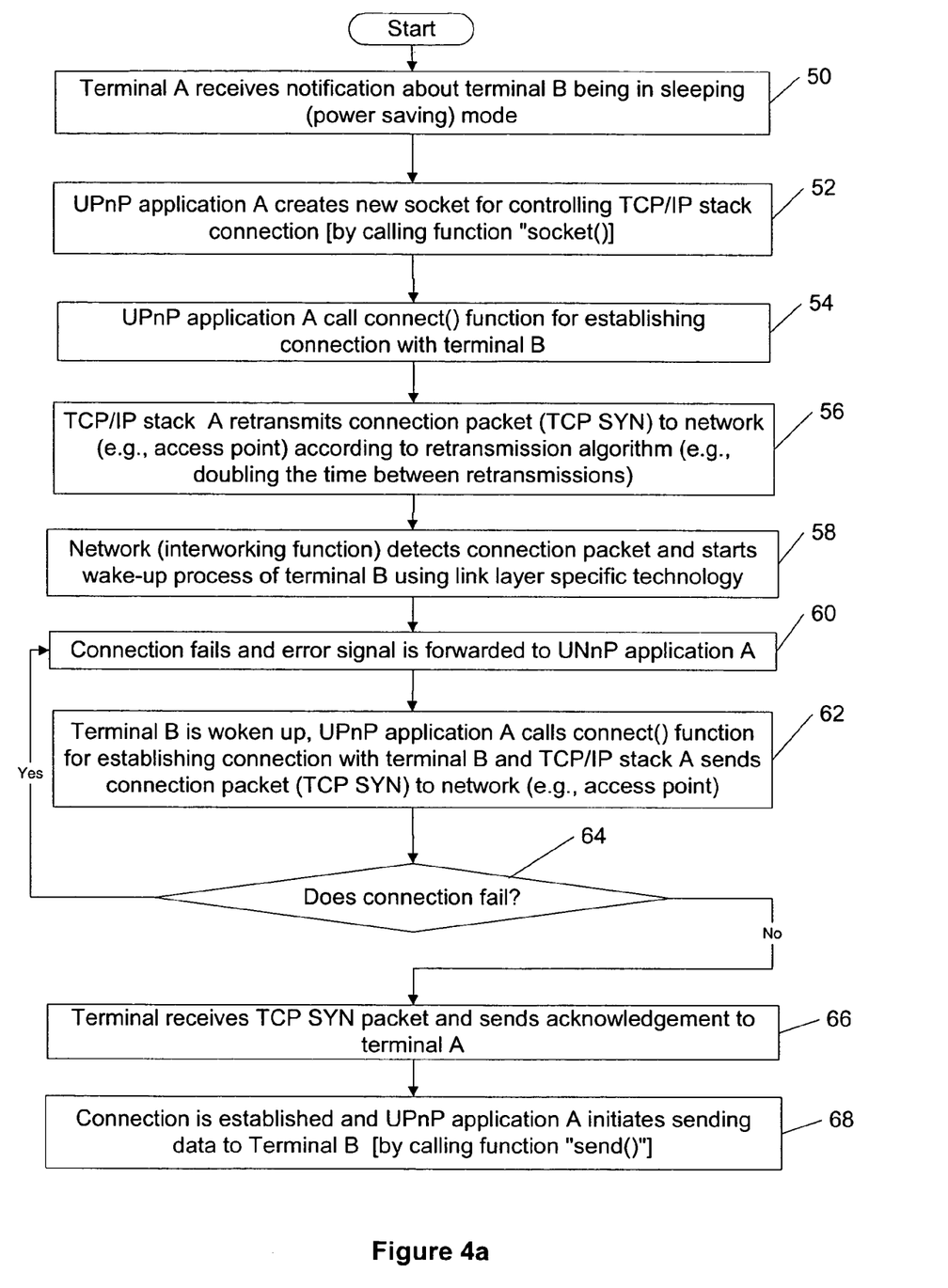
FIGS. 4a and 4b are a flow chart and a diagram, respectively, describing an alternative embodiment wherein the prior connection is not established between a terminal and a further terminal and the further terminal is in a sleeping mode, according to the present invention.
Figure 4B:
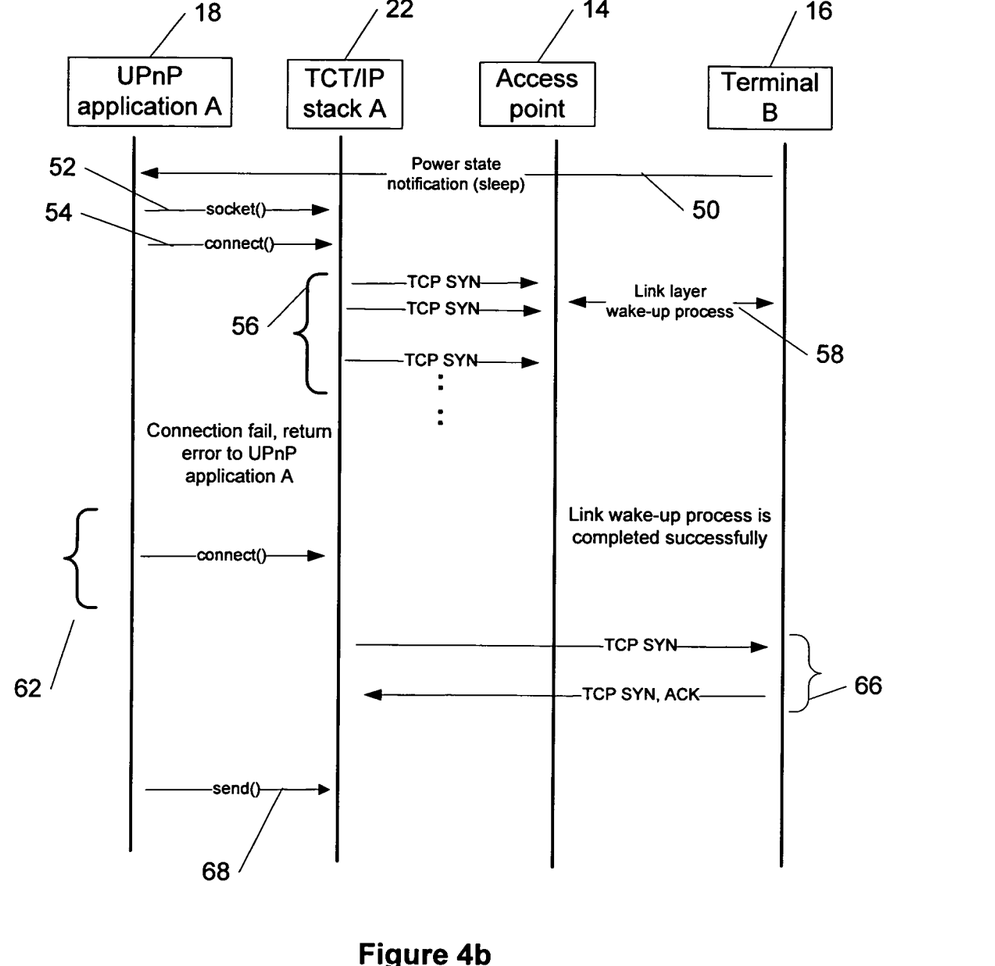

FIGS. 4*a* and 4*b* are a flow chart and a diagram, respectively, describing an alternative embodiment (similar to the one presented in FIGS. 3*a* and 3*b*) among others wherein the prior connection is not established between the terminal 10 (the terminal A) and a further terminal 16 (the terminal B) and the further terminal 16 is in a sleeping mode, according to the present invention. FIG. 4*b* is complimentary to FIG. 4*a* and presented for more detailed and in-depth understanding of the flow chart of FIG. 4*a*.

The flow chart of FIG. 4*a* represents only one possible scenario among many others. In a method according to the present invention, in a first step 50, the terminal A 10 receives the notification about the terminal B 16 being in the sleeping (power saving) mode. The information about the nature of the power saving mode of the terminal B (further terminal) 16 can be facilitated the same way as described in regard to step 30 of FIG. 3*a* (i.e., step 50 is similar to step 30 of FIG. 3*a*).

In a next step 52, the universal plug and play application 18 of the terminal 10 creates a new socket in the TCP/IP stack A 22 using, e.g., the socket( ) function (as shown in FIG. 4*b*) for communicating with the further terminal 16. In a next step 54, the universal plug and play application 18 instructs the TCP/IP stack A 22 to establish the connection using, e.g., the connect( ) function (as shown in FIG. 4*b*) with the further terminal 16. In a next step 56, the TCP/IP stack A 22 transmits (re-transmits) a connection communication (shown as a TCP SYN in FIG. 4*b*) to the network 12 (e.g., the access point 14) according to the known retransmission algorithm (e.g., by doubling the time between retransmissions). In a next step 58, the network 12 (the interworking function) detects the connection communication and starts the wake-up process of the terminal B 16 attempting to wake up the terminal B 16 using, e.g., a link layer specific technology (or alternatively when the terminal B16 polls incoming packets, it notices a connection establishment and moves to the active state). Step 52, 54, 56 and 58 are similar to steps 32, 36, 38 and 40, respectively, of FIG. 3*a*.

In a next step 60, the connection fails and an error signal is forwarded to the UPnP application A 18. Instead of informing the user about the connection failure (that would be the prior art), according to the predetermined criterion, after receiving one or more such error signals and after waiting a further time interval (from the original connect attempt) typically slightly bigger than the time required for the terminal B 16 to wake up, in a next step 62, after the terminal B 16 is woken up, the UPnP application A 18 calls again the connect( ) function for establishing the connection with the terminal B 16 and the TCP/IP stack A 22 sends the connection communication (TCP SYN) to the network 12 (e.g., the access point 14) again.

In a next step 64, it is ascertained whether the connection fails. As long as that is the case, the process goes back to step 60. This feedback process can have a set time limit (e.g., 30 seconds). However, if it is ascertained that the connection is successful, in a next step 66, the terminal B 16 is woken up, receives the connection communication and sends an acknowledgement (shown as the TCP SYN, ACK in FIG. 4*b*) to the terminal A 10. In a next step 68, the connection is established and the UPnP application A 18 initiates sending data to the terminal B 16 (e.g., by calling the send( ) function as shown in FIG. 4*b*).

Figure 5A:
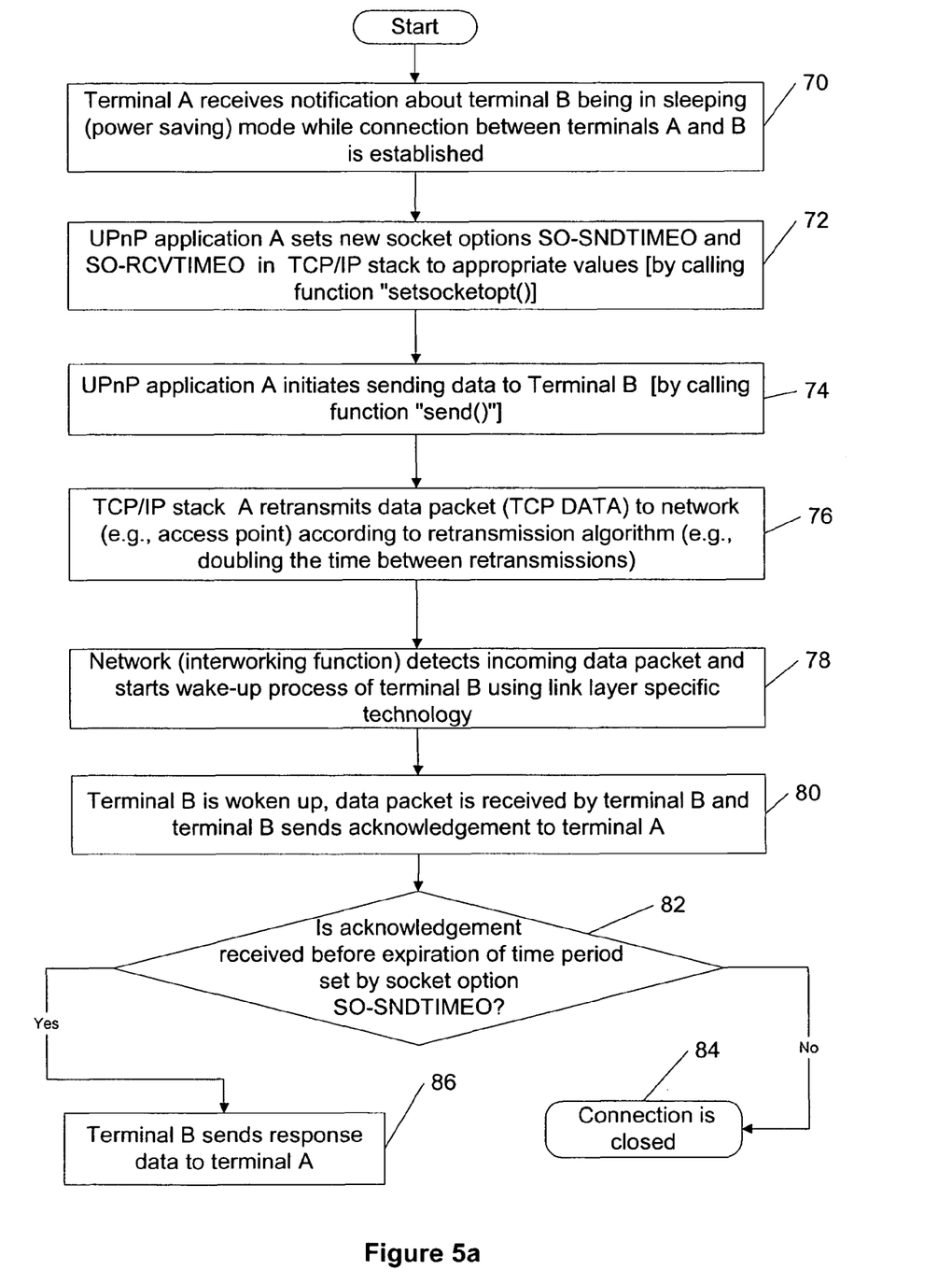
FIGS. 5a and 5b are a flow chart and a diagram, respectively, describing another embodiment wherein the prior connection is established between a terminal and a further terminal and the further terminal goes to a sleeping mode, according to the present invention.
Figure 5B:
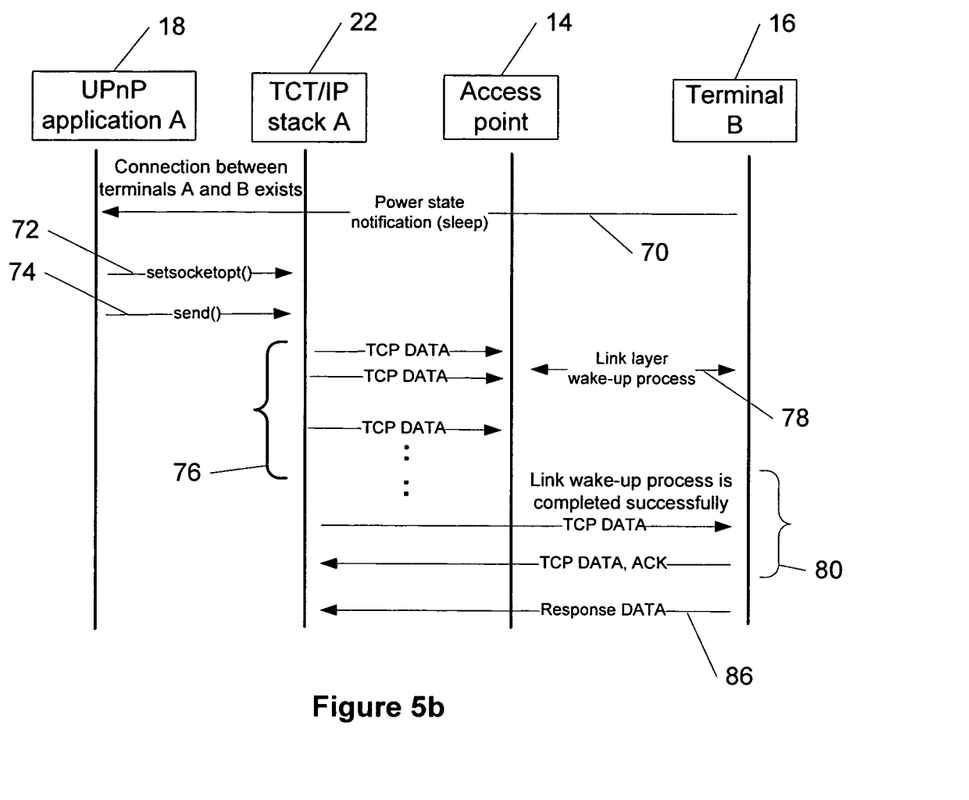

FIGS. 5*a* and 5*b* are a flow chart and a diagram, respectively, describing one embodiment among others wherein the prior connection is established between the terminal (the terminal A) 10 (i.e., the socket is already created by said universal plug and play application 18 in the TCP/IP stack 22 of the terminal 10 for communicating with the further terminal 16) and the further terminal 16 is going to the sleeping mode (e.g., after a certain period of inactivity), according to the present invention. FIG. 5*b* is complimentary to FIG. 5*a* and presented for more detailed and in-depth understanding of the flow chart of FIG. 5*a*.

The flow chart of FIG. 5*a* represents only one possible scenario among many others. In a method according to the present invention, in a first step 70, the terminal A 10 receives a notification about the terminal B 16 being in the sleeping (power saving) mode. The information about the nature of the power saving mode of the terminal B (the further terminal) 16 can be facilitated the same way as described in regard to step 30 of FIG. 3*a* (i.e., step 70 is similar to steps 30 of FIG. 3*a* and step 50 of FIG. 4*a*, respectively).

In a next step 72, the universal plug and play application 18 sets, using, e.g., the setsocketopt( ) function (as shown in FIG. 5*b*), a socket option SO-SNDTIMEO, defining in said TCP/IP stack 22 a time limit for sending said communication signal by said terminal A 10, and a socket option SO-RCVTIMEO, defining in said TCP/IP stack 22 a time limit for receiving data from said further terminal (the terminal B) 16 based on the predetermined criterion. The SO_SNDTIMEO option sets a timeout (e.g., in milliseconds) for send calls, if a send call times out, the connection is in an undetermined state and should be closed and SO_RCVTIMEO option sets a timeout (e.g., in milliseconds) for receive calls, if a receive call times out, the connection is in an undetermined state and should be closed.

In a next step 74, the universal plug and play application 18 instructs the TCP/IP stack A 22 to send data using, e.g., the data( ) function (as shown in FIG. 5*b*) to the further terminal 16.

In a next step 76, the TCP/IP stack A 22 transmits (re-transmits) a data communication signal (shown as a TCP DATA in FIG. 5*b*) to the network 12 (e.g., the access point 14) according to the known retransmission algorithm (e.g., by doubling the time between retransmissions). In a next step 78, the network 12 (the interworking function) detects the data communication signal and starts the wake-up process of the terminal B 16 attempting to wake up the terminal B 16 using, e.g., a link layer specific technology (or alternatively when the terminal B16 polls incoming packets, it notices incoming data and moves to the active state). In a next step 80, the terminal B 16 is woken up, receives the data communication signal and sends an acknowledgement (shown as the TCP DATA, ACK in FIG. 5*b*) to the terminal A 10.

In a next step 82, it is ascertained whether the acknowledgement is received before expiration of the time period set by the new socket option SO-SNDTIMEO. As long as that is not the case, the connection session is in the undetermined state and is closed in step 84. However, if it is ascertained that the acknowledgement is received before the expiration of the time period set by the new socket option SO-SNDTIMEO, in a next step 86, the connection stays on and the terminal B 16 sends a response data communication signal to the terminal A 10. If the response data communication signal is received by the terminal A 10 before the expiration of the time period set by the new socket option SO-RCVTIMEO, the response data communication signal is accepted and acknowledged by the terminal A 10, otherwise (if the time period set by the new socket option SO-RCVTIMEO is expired), the connection session is in the undetermined state and should be closed as pointed out above.

It is noted that the examples presented in FIGS. 2, 3*a*, 3*b*, 4*a*, 4*b*, 5*a* and 5*b* represent only one implementation utilizing the universal plug and play application A 18 or B 24, the TCP/IP stack A 22 or B 28 and the Berkeley software distribution (BSD) socket application programming interface (API) 20 or 26. According to the present invention, alternative implementations can include generally a communication application (the universal plug and play application A 18 or B 24 being only one such communication application), a protocol stack (the TCP/IP stack A 22 or B 28 being only one such protocol stack) and different socket applications facilitated by various APIs different from the BSD API 20 or 26.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
  receiving by a terminal a notification about a power saving mode of a further terminal;
  selecting a waiting time interval in response to the notification about the power saving mode of the further terminal, wherein said waiting time interval is selected based at least on a time needed for said further terminal to wake up from the power saving mode;
  providing to a network by a protocol stack of said terminal a connection communication signal for establishing said connection with said further terminal by transmitting said communication signal according to a pre-selected procedure using a communication application available in said terminal, whereby communications can be established to the further terminal when the further terminal is in the power saving mode; and
  receiving by said terminal, after said further terminal is woken up, an acknowledgement of receiving said communication signal by said further terminal,
  wherein said terminal waits for said acknowledgement at least for the waiting time interval before terminating said establishing based on a predetermined criterion facilitated by said communication application of the terminal, and
  wherein if the acknowledgement is received before the expiration of the waiting time interval, the connection is established.

2. The method of claim 1, wherein said power saving mode is a sleeping mode.

3. The method of claim 1, wherein said communication application is a universal plug and play application, said protocol stack is an internet protocol suite stack and there is no connection established between the terminal and the further terminal before receiving by said terminal said notification, and wherein before said providing to said network by said terminal said communication signal, the method comprises:
  creating by said universal plug and play application a new socket in the internet protocol suite stack of the terminal for communicating with said further terminal;
  setting by said universal plug and play application a new socket option defining in said internet protocol suite stack a time limit for establishing said connection with said further terminal; and
  instructing said internet protocol suite stack by said universal plug and play application to establish said connection with said further terminal.

4. The method of claim 3, wherein said communication signal is provided to said network in response to said instructing, said acknowledgement is an acknowledgement for establishing a successful connection between said terminal and said further terminal and said waiting time interval is defined by said time limit defined by said new socket option.

5. The method of claim 1, wherein said communication application is a universal plug and play application, said protocol stack is an internet protocol suite stack and there is no connection established between the terminal and the further terminal before receiving by said terminal said notification, and wherein before said providing to said network by said terminal said communication signal, the method comprises:
  creating by said universal plug and play application a new socket in the internet protocol suite stack of the terminal for communicating with said further terminal; and
  instructing said internet protocol suite stack by said universal plug and play application to establish said connection with said further terminal.

6. The method of claim 5, wherein said communication signal is a connection communication signal which initiates establishing of said connection and said acknowledgement is an acknowledgement for establishing a successful connection between said terminal and said further terminal and wherein said providing to said network by said terminal said communication signal comprises:
  providing to said network by said terminal said communication signal in response to said instructing by re-transmitting said communication signal according to said pre-selected procedure;
  receiving a time-out error by said universal plug and play application;
  further instructing said interne protocol suite stack by said universal plug and play application to establish said connection with said further terminal by further re-transmitting said communication signal according to a pre-selected procedure after a predetermined time period which is at least equal to said waiting time interval needed for said further terminal to wake up; and
  providing to said network by said terminal said communication signal in response to said further instructing by said further re-transmitting said communication signal according to said pre-selected procedure.

7. The method of claim 1, wherein operations performed on or by said protocol stack are facilitated by a Berkeley software distribution socket application programming interface.

8. The method of claim 1, wherein said terminal or the further terminal is for a wireless communications.

9. A computer program product comprising: a computer readable non-transitory storage structure encoded with a computer program code thereon for execution by a computer processor with said computer program code, wherein said computer program code comprises instructions for performing the method of claim 1.

10. A terminal, comprising a computer readable non-transitory storage structure embodying:
  a protocol stack, responsive to a notification about a power saving mode of a further terminal for selecting a waiting time interval based at least on a time needed for said further terminal to wake up from the power saving mode, and configured to provide to a network a connection communication signal for establishing said connection with said further terminal by transmitting said communication signal according to a pre-selected procedure, whereby communications can be established to the further terminal when the further terminal is in the power saving mode;

a communication application, configured to provide to said protocol stack instructions according to a predetermined criterion defining the waiting time interval for receiving an acknowledgement of receiving said communication signal by said further terminal after said further terminal is woken up; and wherein if the acknowledgement is received before the expiration of the waiting time interval, the connection is established.

11. The terminal of claim 10, wherein said power saving mode is a sleeping mode.

12. The terminal of claim 10, wherein said communication application is a universal plug and play application, said protocol stack is an internet protocol suite stack and there is no connection established between the terminal and the further terminal before receiving by said terminal said notification, and wherein before said providing to said network by said terminal said communication signal said universal plug and play application is configured to provide:

creation of a new socket in the internet protocol suite stack for communicating with said further terminal;

setting a new socket option defining in said internet protocol suite stack a time limit for establishing said connection with said further terminal; and an instruction to said internet protocol suite stack for establishing said connection with said further terminal.

13. The terminal of claim 12, wherein said protocol stack is configured to provide said communication signal to said network in response to said instruction, said communication signal is a connection communication signal for establishing of said connection, said acknowledgement is an acknowledgement for establishing a successful connection between said terminal and said further terminal and said waiting time interval is defined by said time limit defined by said new socket option.

14. The terminal of claim 10, wherein said communication application is a universal plug and play application, said protocol stack is an internet protocol suite stack and there is no connection established between the terminal and the further terminal before receiving by said terminal said notification, and wherein before providing said communication signal to said network by said terminal said universal plug and play application is configured to cause the terminal at least to perform:

creation of a new socket in the internet protocol suite stack for communicating with said further terminal; and provision of an instruction to said internet protocol suite stack for establishing said connection with said further terminal.

15. The terminal of claim 14, wherein said communication signal is a connection communication signal which initiates establishing of said connection and said acknowledgement is an acknowledgement for establishing a successful connection between said terminal and said further terminal and wherein said terminal is configured to provide to said network said communication signal by:

providing to said network said communication signal in response to said instruction by re-transmitting said communication signal according to said pre-selected procedure;

receiving a time-out error by said universal plug and play application;

further instructing said internet protocol suite stack by said universal plug and play application to establish said connection with said further terminal by further re-transmitting said communication signal according to a pre-selected procedure after a predetermined time period which is at least equal to said waiting time interval needed for said further terminal to wake up; and providing to said network said communication signal in response to said further instructing by said further re-transmitting said communication signal according to said pre-selected procedure.

16. The terminal of claim 10, wherein operations performed on or by said protocol stack are facilitated by a Berkeley software distribution socket application programming interface.

17. A communication system, comprising:

a further terminal being a power saving mode, responsive to a wake up call;

a terminal, responsive to a notification about a power saving mode of the further terminal, configured to select a waiting time interval in response to the notification about the power saving mode of the further terminal, wherein said waiting time interval is selected based at least on a time needed for said further terminal to wake up from the power saving mode, and configured to provide a connection communication signal for establishing said connection with said further terminal by transmitting said communication signal according to a pre-selected procedure, whereby communications can be established to the further terminal when the further terminal is in the power saving mode, and configured to provide instructions according to a predetermined criterion defining the waiting time interval for receiving an acknowledgement of receiving said communication signal by said further terminal after said further terminal is woken up;

a network, configured to provide said notification, configured to provide said wake up call for waking up said further terminal in response to said communication signal, configured to facilitate sending signals between said terminal and said further terminal, wherein a universal plug and play application is available in said terminal and said further terminal, and wherein if the acknowledgement is received before the expiration of the waiting time interval, the connection is established.

18. The communication system of claim 17, wherein said terminal or the further terminal is a mobile terminal, a wireless device, a portable device, a mobile communication device or a mobile phone.

19. A method, comprising:

receiving by a terminal a notification about a power saving mode of a further terminal;

selecting a waiting time interval in response to the notification about the power saving mode of the further terminal, wherein said waiting time interval is selected based at least on a time needed for said further terminal to wake up from the power saving mode providing to a network by a protocol stack of said terminal a connection communication signal for establishing said connection with said further terminal by transmitting said communication signal according to a pre-selected procedure using a communication application available in said terminal and said further terminal, whereby communications can be established to the further terminal when the further terminal is in the power saving mode;

detecting said communication signal and starting a wake-up process of said further terminal in response to said communication signal; and receiving, after said further terminal is woken up, said communication signal by said further terminal and sending an acknowledgement of receiving said communication signal to said terminal by said further terminal, wherein said terminal waits for said acknowledgement at least for the waiting time interval before terminating said establishing based on a predetermined criterion facilitated by a communication application of the terminal, and wherein if the acknowledgement is received before the expiration of the waiting time interval, the connection is established.

20. The method of claim 19, wherein said power saving mode is a sleeping mode.

* * * * *

UNITED STATES PATENT AND TRADEMARK OFFICE
CERTIFICATE OF CORRECTION

| | | |
|---|---|---|
| PATENT NO. | : 8,935,405 B2 | Page 1 of 1 |
| APPLICATION NO. | : 11/082633 | |
| DATED | : January 13, 2015 | |
| INVENTOR(S) | : Stirbu et al. | |

It is certified that error appears in the above-identified patent and that said Letters Patent is hereby corrected as shown below:

In the Claims

Claim 6, col. 12, line 32 "interne" should be deleted and --internet-- should be inserted.

Signed and Sealed this
Fifth Day of May, 2015

Michelle K. Lee
*Director of the United States Patent and Trademark Office*